(12) United States Patent
Soucie et al.

(10) Patent No.: US 10,408,660 B2
(45) Date of Patent: Sep. 10, 2019

(54) ELECTRONIC FLUID LEVEL INDICATOR

(71) Applicant: Orscheln Products L.L.C., Moberly, MO (US)

(72) Inventors: Wayne Lawrence Soucie, Columbia, MO (US); Jeffrey Earl Tayon, Moberly, MO (US); Jeffrey J. Pendleton, Moberly, MO (US); Matthew Aaron Nevels, Columbia, MO (US)

(73) Assignee: Orscheln Products L.L.C., Moberly, MO (US)

( * ) Notice: Subject to any disclaimer, the term of this patent is extended or adjusted under 35 U.S.C. 154(b) by 139 days.

(21) Appl. No.: 15/674,037

(22) Filed: Aug. 10, 2017

(65) Prior Publication Data

US 2018/0045549 A1 Feb. 15, 2018

Related U.S. Application Data

(60) Provisional application No. 62/373,554, filed on Aug. 11, 2016.

(51) Int. Cl.
*G01F 23/24* (2006.01)
*G01F 23/04* (2006.01)

(52) U.S. Cl.
CPC .............. *G01F 23/24* (2013.01); *G01F 23/04* (2013.01); *G01F 23/242* (2013.01); *G01F 23/246* (2013.01)

(58) Field of Classification Search
CPC ........ G01F 23/24; G01F 23/04; G01F 23/242; G01F 23/246; G01F 23/2963; G01F 23/72; G01F 23/74; G01F 23/265; G01F 23/268; G01F 23/266
See application file for complete search history.

(56) References Cited

U.S. PATENT DOCUMENTS

| | | | |
|---|---|---|---|
| 4,596,141 A | 6/1986 | Kondo | |
| 4,679,432 A | 7/1987 | Draeger | |
| 4,751,845 A | 6/1988 | Peterson et al. | |
| 4,845,469 A | 7/1989 | Benda | |
| 4,981,039 A * | 1/1991 | Hayashi | G01F 23/74 337/207 |
| 4,988,975 A | 1/1991 | Nap | |

(Continued)

FOREIGN PATENT DOCUMENTS

GB 2022844 A 12/1979

OTHER PUBLICATIONS

"Fluid Level Indicators" brochure, Orscheln (published prior to Aug. 11, 2016).

*Primary Examiner* — Helen C Kwok
(74) *Attorney, Agent, or Firm* — Harness, Dickey & Pierce, PLC (57) ABSTRACT

An electronic fuel level indicator includes an elongated circuit board containing multiple elongated slots separated by a land segment of the circuit board, and an elongated wire spanning across the slots and being clamped to the land segment. Another aspect provides at least one elongated polymeric and/or insulating cover retained against a circuit board and a portion of the wire solely by insertion of the circuit board and cover within an elongated hollow tube through which fluid may flow. A method of assembling an electronic fluid level indicator is also provided.

20 Claims, 5 Drawing Sheets

(56) References Cited

U.S. PATENT DOCUMENTS

| | | | |
|---|---|---|---|
| 5,076,100 A * | 12/1991 | Hunter | G01F 23/2963 |
| | | | 324/207.13 |
| 5,210,769 A | 5/1993 | Seidel et al. | |
| 6,098,457 A | 8/2000 | Poole | |
| 6,237,411 B1 | 5/2001 | Schimmel et al. | |
| 6,314,808 B1 | 11/2001 | Williams et al. | |
| 6,356,071 B1 * | 3/2002 | Koski | B01D 39/20 |
| | | | 324/207.13 |
| 6,453,740 B1 | 9/2002 | Williams et al. | |
| 6,543,283 B2 | 4/2003 | Acht et al. | |
| 6,548,283 B1 | 4/2003 | Dunlop et al. | |
| 6,578,415 B2 | 6/2003 | Schimmel et al. | |
| 6,935,044 B2 | 8/2005 | Dougherty et al. | |
| 6,988,403 B2 | 1/2006 | Dougherty et al. | |
| 7,055,384 B2 | 6/2006 | Williams et al. | |
| 7,131,213 B2 | 11/2006 | Dougherty et al. | |
| 7,134,220 B2 | 11/2006 | Porter et al. | |
| 7,571,646 B1 | 8/2009 | Houghton | |
| 9,228,879 B2 | 1/2016 | O'Brien | |
| 2004/0045353 A1 * | 3/2004 | Patel | G01F 23/2962 |
| | | | 73/290 R |
| 2007/0056365 A1 | 3/2007 | Stahlmann | |
| 2008/0107151 A1 * | 5/2008 | Khadkikar | G01F 1/696 |
| | | | 374/141 |
| 2009/0112507 A1 * | 4/2009 | Edney | G01K 1/14 |
| | | | 702/136 |
| 2015/0059469 A1 * | 3/2015 | Batti | G01K 1/14 |
| | | | 73/295 |
| 2017/0191861 A1 * | 7/2017 | Rondano | G01F 23/26 |
| 2017/0205338 A1 * | 7/2017 | Coates | G01J 3/00 |
| 2017/0261361 A1 * | 9/2017 | Rondano | G01F 23/26 |
| 2017/0279167 A1 * | 9/2017 | Herrema | H01M 10/484 |
| 2018/0100753 A1 * | 4/2018 | Cumbie | G01F 23/22 |
| 2018/0172535 A1 * | 6/2018 | Harsh | G01L 9/0075 |

\* cited by examiner

ELECTRONIC FLUID LEVEL INDICATOR

CROSS-REFERENCE TO RELATED APPLICATIONS

This application claims the benefit of U.S. Provisional Application No. 62/373,554, filed on Aug. 11, 2016. The entire disclosure of the above application is incorporated herein by reference.

BACKGROUND AND SUMMARY

The present disclosure relates generally to fluid level indicators and more particularly to an electronic fluid level indicator.

Various electronic fluid level indicators have been used in the automotive vehicle industry for determining if a proper amount of oil is in an engine sump or oil pan. One conventional electronic fluid level indicator has a single elongated opening in a printed circuit board within which a six inch long resistive wire is secured by a spring. The printed circuit board and wire are located within a hollow tube.

Another traditional approach employs an elongated polymeric overmolding upon stamped and conductive metal circuits with a resistive wire attached thereto; these are retained within a polymeric housing. Examples of such traditional devices are disclosed in the following U.S. Pat. No. 6,578,415 entitled "Limit-Level Sensor and Method of Determining the Undershooting or Overshooting of an Intended Level of Liquid in a Container" which issued to Schimmel et al. on Jun. 17, 2003; U.S. Pat. No. 6,548,283 entitled "Sensor for Determining the Level and Temperature of a Liquid" which issued to Acht et al. on Apr. 8, 2003; U.S. Pat. No. 5,210,769 entitled "Liquid Level Measuring System" which issued to Seidel et al. on May 11, 1993; and U.S. Pat. No. 4,679,432 entitled "Probe for Measuring the Level of a Liquid" which issued to Draeger on Jul. 14, 1987; all of which are incorporated by reference herein. These prior devices are prone to premature failures due to vibration of the unsupported resistive wire and/or thermistor.

In accordance with the present invention, an electronic fuel level indicator includes an elongated circuit board containing multiple elongated slots separated by a land segment of the circuit board, and an elongated wire spanning across the slots and being clamped to the land segment. Another aspect provides at least one elongated polymeric and/or insulating cover retained against a circuit board and a portion of the wire solely by insertion of the circuit board and cover within an elongated hollow tube through which fluid may flow. A method of assembling an electronic fluid level indicator is also provided.

The present electronic fluid level indicator is advantageous over prior devices in that the present electronic fluid level indicator allows for a longer length of circuit board and/or resistive wire to be employed, thus, improved resistance sensing, while also reducing vibrational failure modes. Furthermore, the present electronic fluid level indicator advantageously provides improved fluid inlets, outlets and internal channels thereby allowing improved fluid flow access to the resistive wire and temperature sensor. The resistive wire of the present electronic fluid level indicator also requires less resistance per foot than traditional constructions. Moreover, the present construction leads to less expensive assembly. Additional features and benefits of the present invention will become apparent from the following description and appended claims, taken in conjunction with the accompanying drawings.

DETAILED DESCRIPTION

The preferred embodiment of a hot wire sensor type of electronic fluid level indicator 21 is shown in FIGS. 1-8. Electronic fluid level indicator 21 includes a dipstick assembly 23, a hollow protective tube 25 and an end fitting 27. An externally threaded section 29 of fitting 27 engages within an internally threaded segment 31 of an engine block 33 such that tube 25 is inserted into a sump or oil pan container 35 within which is engine oil, or other relatively non-conductive liquid fluid. Tube 25 is internally attached within a collar 37 of fitting 27, such as via crimping or brazing. Tube 25 is a longitudinally elongated, rigid and metallic (preferably steel) member and has openings 39 through a lateral side thereof to allow air venting and/or fluid access between its open distal end 41 and openings 39.

Dipstick assembly 23 includes a three pin connector 51, an elongated printed circuit board 53 soldered to the connector 51, a longitudinally elongated resistive wire 55, an extension spring 57 and polymeric covers 59. Furthermore, electronic components, including a thermistor sensor 61 and a resistor 63, are electrically connected to printed circuit traces, such as a wire solder pad 65, and/or any of the electrical connecting pins centrally freestanding within connector 51. Alternate fluid sensors may include a thermocouple, RTD, or the like. Resistor 63 is surface-mounted to printed circuit board 53 in an electrically parallel manner to resistive wire 55 and sends a signal to an electronic control unit 67 remotely located away from but electrically connected to connector 51 via a body connector 69 and wire harness. An O-ring 58 seals between fitting 27 and an internal bore of engine block 33, while another O-ring 60 seals between an outside surface of connector 51 and an internal bore 62 of fitting 27, when installed.

Printed circuit board 53 is longitudinally elongated and generally rigid. Printed circuit board 53 further includes a pair of flat opposite faces 71 and 73 bordered by a thinner peripheral edge 75 within which there are multiple semicircular notches 77. At least two, and more preferably three, longitudinally elongated slots 79 internally extend through faces 71, 73 of printed circuit board 53. The fluid can flow through these slots. Each pair of adjacent slots 79 is separated by a solid land segment 81 of the printed circuit board.

One loop or hook 83 of spring 57 is coupled within a hole of printed circuit board 53 while an opposite loop or hook 85 of spring 57 is coupled to a folded proximal end of wire 55. Distal ends of wire 55 are soldered to solder trace pads 65 on opposite faces 71, 73 of printed circuit board 53. In other words, an upper length of wire 55 extends from one pad 65 to spring 57, is then folded back and returns parallel thereto on an opposite face 71 or 73 of printed circuit board 53, terminating on the opposite pad 65. Therefore, wire 55 has double the total length but without the need to extend the longitudinal length of printed circuit board 53 or outer tube 25. In the preferred exemplary embodiment, the total length of wire 55 is approximately 18 inches (9 inches per side) with an effective functional length of about 8 inches per side. Nevertheless, it is envisioned that a total wire length greater than 6 inches and less than or equal to 20 inches may alternately work, depending on system voltage and current requirements. Wire is preferably about 3/1,000 inch thick, although a different diameter may be employed. Spring 57 serves to keep wire 55 longitudinally taut despite contraction and expansion thereof as the fluid heats and cools. It is noteworthy that a majority of wire 55 spans over slots 79 along planes defined by both faces 71, 73 of printed circuit board 53.

Figures 5, 6:
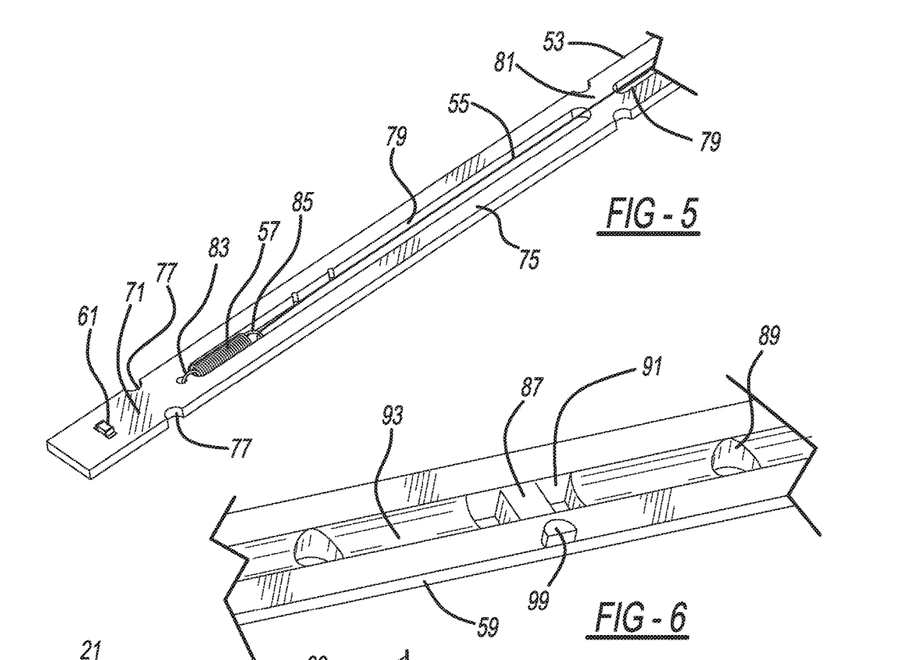
FIG. 5 is a fragmentary perspective view showing the dipstick assembly of the present electronic fluid level indicator.
FIG. 6 is a fragmentary perspective view showing an inside of a cover employed with the present electronic fluid level indicator.

Intermediate segments of wire 55 are clamped between each land 81 and a localized clamping rib 87 projecting from an inside surface of each cover 59. This clamping serves to reduce undesired vibration of wire 55 initiated by vibration of the device to which the indicator is attached. Each cover 59 additionally includes multiple spaced apart circular apertures 89 and somewhat rectangular apertures 91. These apertures are in communication with a partially circular cross-sectionally shaped and longitudinally elongated fluid channel 93 to allow the fluid to flow between each cover 59 and the printed circuit board 53 (or within the slots 79) such that the fluid is in direct contact with all sides of a majority of resistance wire 55 except at lands 81. Additionally, laterally outer edges of covers 59 are securely pressed against printed circuit board 53 solely through contact with an internal diameter surface 97 of tube 25. Thus no additional fastener, overmolding or adhesive is required with this preferred embodiment, thereby making assembly of the electronic fluid level indicator considerably less expensive and time consuming than would otherwise occur. Notwithstanding, it should be appreciated that it is alternately envisioned that fasteners or adhesive may be employed although at a cost disadvantage.

Each cover 59 has a substantially flat outside surface 96 and curved outer surfaces 98 disposed laterally outboard of flat outside surfaces 96. Flat outside surfaces 96 are oriented parallel to faces 71, 73 of printed circuit board 53. A fluid flow gap 100 is located between flat outside surfaces 96 and internal diameter surface 97 of tube 25. Curved outside surfaces 98 are shaped to conform to internal diameter surface 97 of tube 25. For example, each curved outside surface 98 can have a curvature radius that is substantially equal to the curvature radius of internal diameter surface 97 of tube 25.

Figures 7, 8:
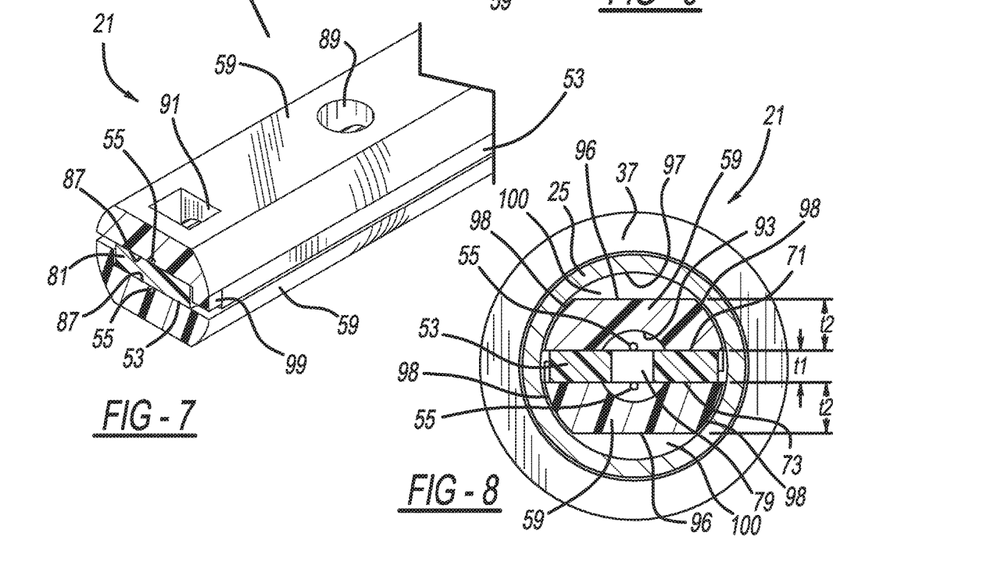
FIG. 7 is a fragmentary perspective view, taken along line 7-7 of FIG. 3, showing the present electronic fluid level indicator.
FIG. 8 is a cross-sectional view, taken along line 8-8 of FIG. 3, showing the present electronic fluid level indicator.

In addition, printed circuit board 53 has a first thickness t1 and each cover 59 has a second thickness t2. The first and second thicknesses t1 and t2, as well as the width of each cover 59 (i.e., the dimension of each cover 59 perpendicular to the second thickness t2 as shown in FIG. 8), can be selected to yield little to no gap between each curved outer surface 98 of covers 59 and internal diameter surface 97 of tube 25 as shown in FIG. 8. This ensures that tube 25 holds covers 59 tightly around printed circuit board 53, which ensures that wire 55 is tightly clamped between lands 81 of printed circuit board 53 and clamping ribs 87 of covers 59.

Fingers 99 internally project from an inside surface of each cover. Fingers 99 are received within notches 77 to assist with alignment of the covers to printed circuit board 53. Covers 59 are preferably injection molded from a Nylon 4/6 polymer, although other insulating spacer materials may alternately be used.

Electronic fuel level indicator 21 may be used with an automotive vehicle engine, an off-road construction vehicle engine, a heavy duty class 8 truck engine, a stationary generator engine or the like. Resistive hot wire sensor 55 is immersed in the oil or other fluid to measure and assist the ECU in indicating the fluid fill level or depth of such. Wire 55 is heated with a constant current source. As the wire heats, the resistance (R) of the wire increases. Due to Ohms law (V=IR) with a constant current and increasing R, voltage (V) must increase. When the rate of heat loss (Q) of the wire is equal to power in, the voltage will level off and become stable as equilibrium is reached. So when $Q=I^2(R)$. The rate of heat loss (Q), changes depending on how much oil/air the wire is in contact with. This means the equilibrium voltage is different for each oil level and therefore wire 55 senses the oil level. Moreover, thermistor 51 on printed circuit board 53 is used to measure the oil temperature. The voltage reading will be offset (compensated) for the oil temperature. This will improve the precision of the output signal readings.

Figure 9:
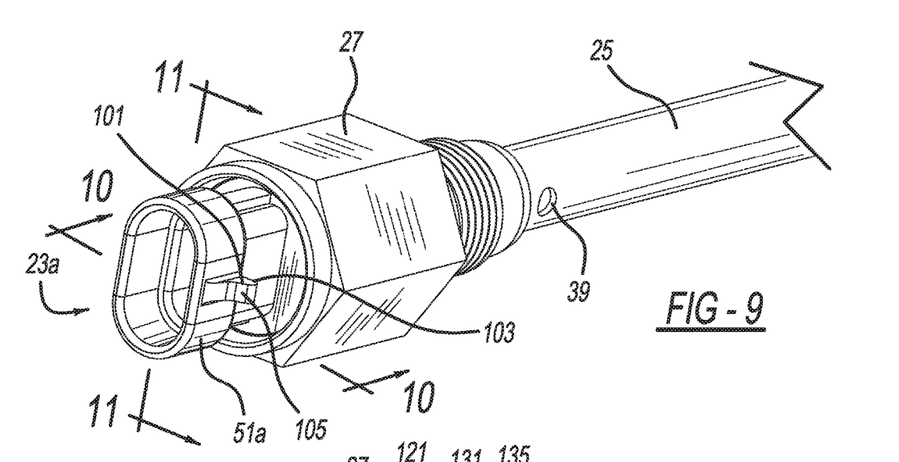
FIG. 9 is a perspective view of another electronic fluid level indicator according to the present disclosure.
Figure 10:
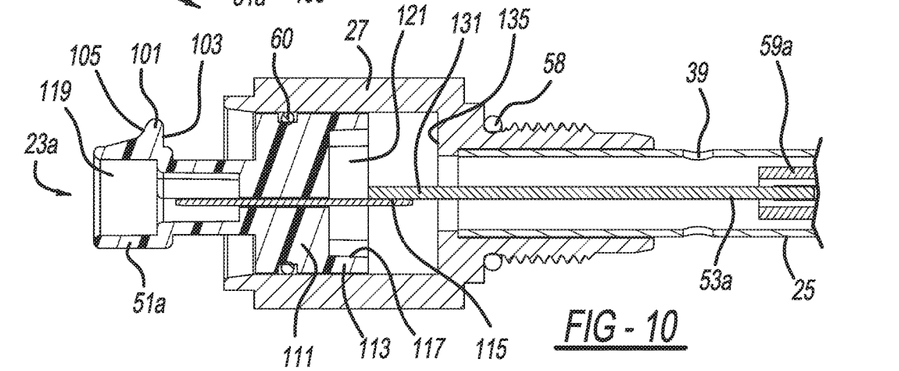
FIG. 10 is a cross-sectional view, taken along line 10-10 of FIG. 9, showing the electronic fluid level indicator of FIG. 9.
Figure 11:
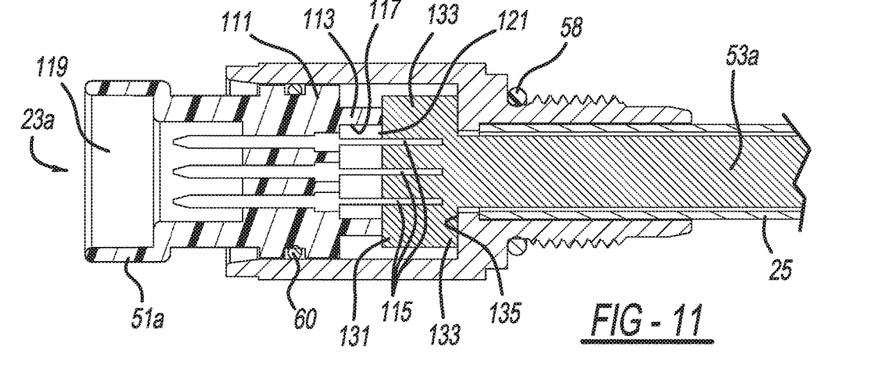
FIG. 11 is a cross-sectional view, taken along line 11-11 of FIG. 9, showing the electronic fluid level indicator of FIG. 9.

Another embodiment of a hot wire sensor type of electronic fluid level indicator 21*a* is shown in FIGS. 9-11. Electronic fluid level indicator 21*a* is substantially similar to electronic fluid level indicator 21 such that only differences between electronic fluid level indicators 21, 21*a* will now be described. Electronic fluid level indicator 21*a* includes a dipstick assembly 23*a*, the hollow protective tube 25, and the end fitting 27. Dipstick assembly 23*a* includes a three pin connector 51*a*, an elongated printed circuit board 53*a* soldered to the connector 51*a*, and polymeric covers 59*a*. Although not shown, dipstick assembly 23*a* also includes the longitudinally elongated resistive wire 55 and the extension spring 57 similar to the dipstick assembly 23.

Figure 1:
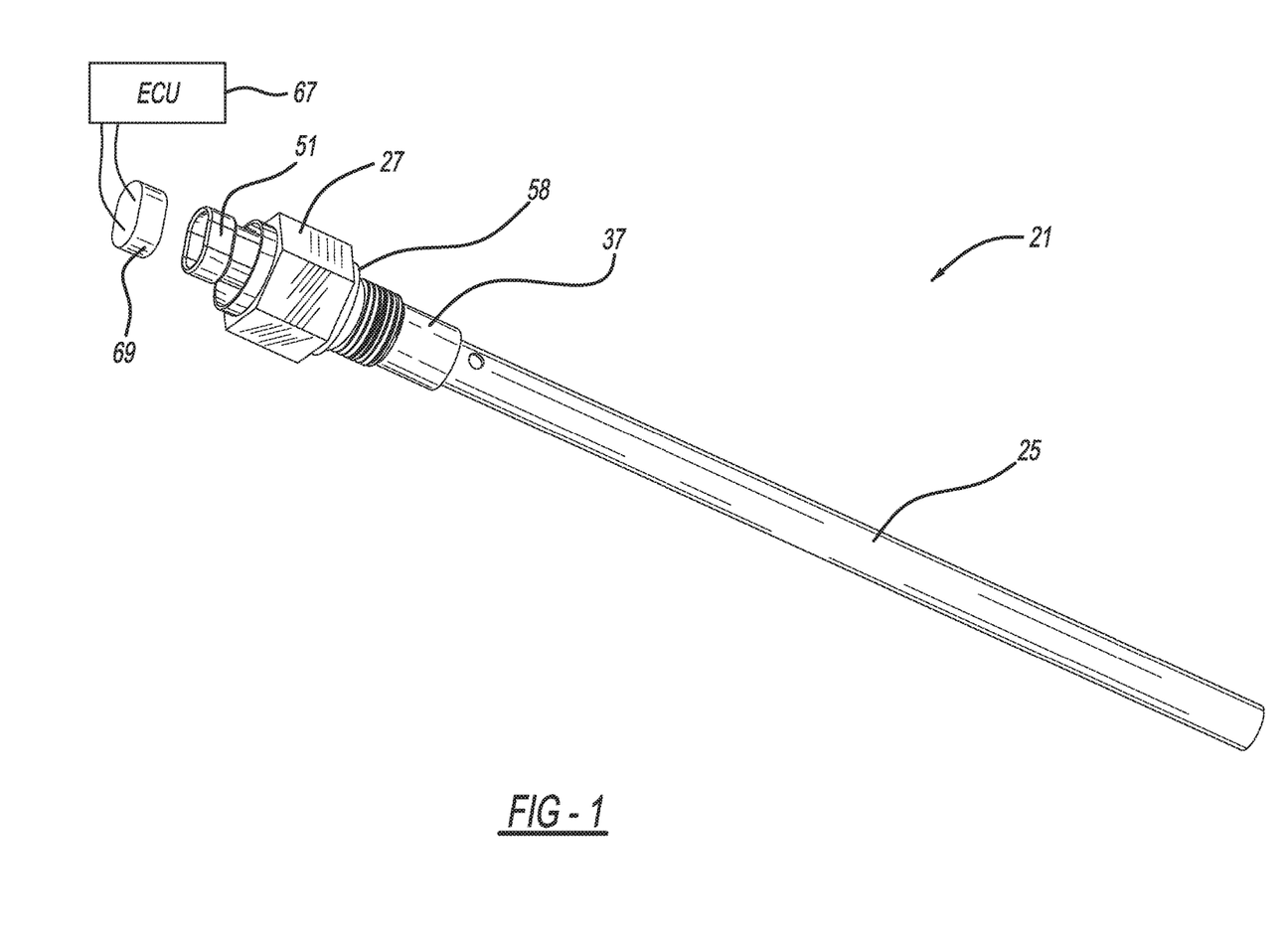
FIG. 1 is a perspective view showing the present electronic fluid level indicator.
Figure 2:
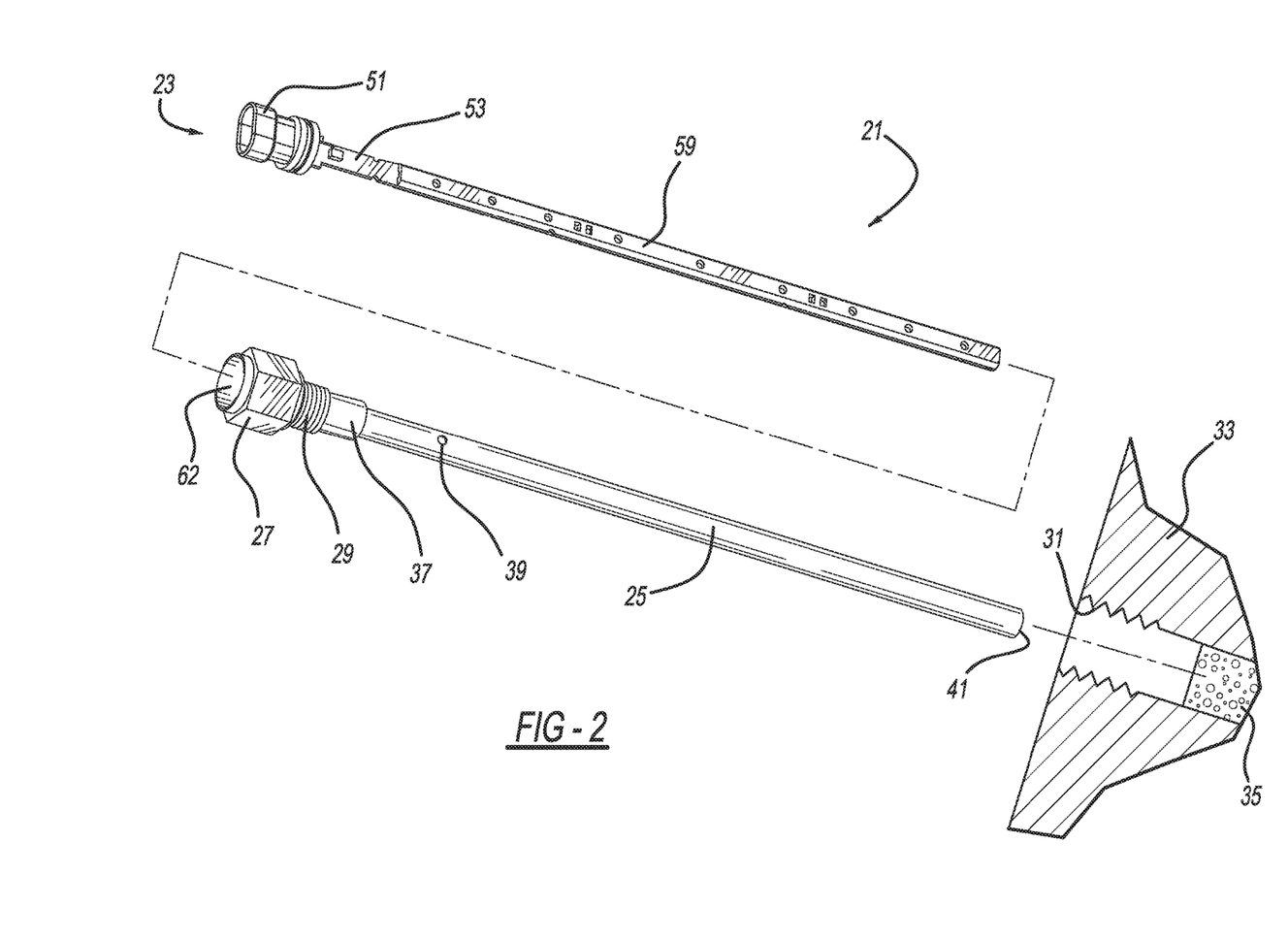
FIG. 2 is a partially exploded perspective view showing the electronic fluid level indicator.
Figure 3:
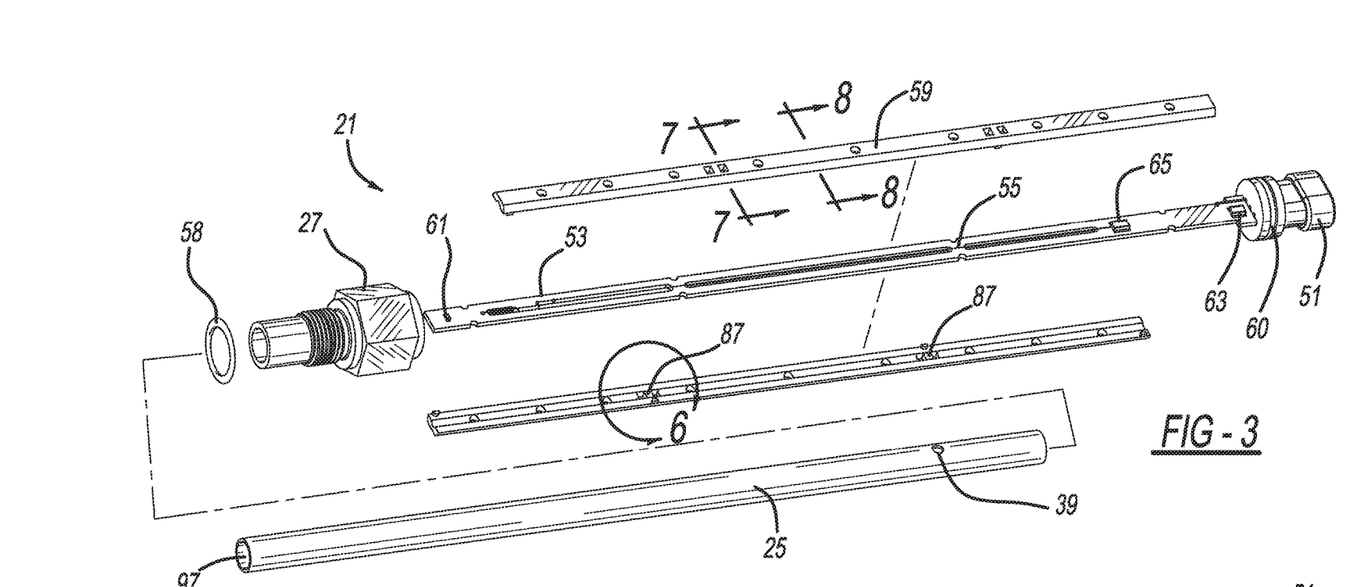
FIG. 3 is an exploded perspective view showing the electronic fluid level indicator.
Figure 4:
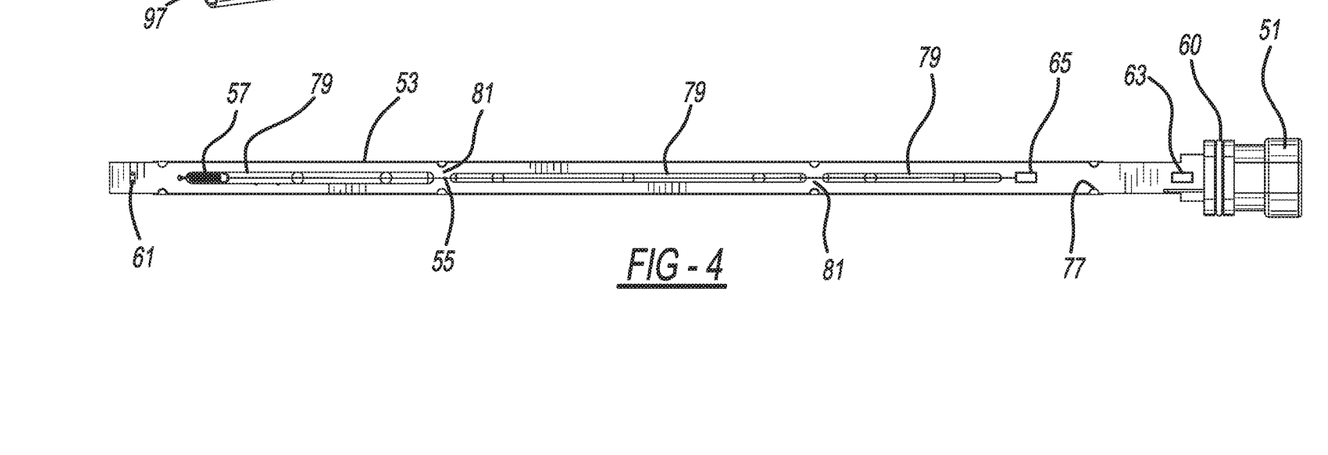
FIG. 4 is a side elevational view showing a dipstick assembly of the present electronic fluid level indicator.

In contrast to connector 51, connector 51*a* includes a barb 101 that fits into a corresponding slot (not shown) of body connector 59 (FIG. 1). Body connector 59 can include a spring-loaded and/or flexible lever (not shown) that extends into the slot and engages a backside surface 103 of barb 101 to retain barb 101 in the slot. As connector 51*a* is inserted into body connector 59, a ramped surface 105 on barb 101 may engage the lever of body connector 59 and displace the lever out of the slot to enable barb 101 to move past the lever. Once the barb is moved past the lever, the lever may return to its relaxed state in the slot and engage the backside surface 103 of barb 101. To remove connector 51*a* from body connector 59, an exposed surface of the lever may be pressed (e.g., by a human finger) to displace the lever out of the slot and thereby enable barb 101 to once again move past the lever.

Connector 51a further includes a main body portion 111 and a collar standoff 113 projecting from main body portion 111. Collar standoff 113 provides clearance for solder connections between printed circuit board 53a and terminal pins 115 of connector 51a. Collar standoff 113 also defines a well 117 for a potting compound such as epoxy. During assembly of connector 51a, pins 115 are pressed into connector body 111 from a front end 119 of connector 51a or a rear end 121 of connector 51a, and then potting compound is added to the well 117 and allowed to cure. Once cured, the potting compound seals small clearances that are present around pins 115 after pins 115 are pressed into connector body 111. After connector 51a is assembled, pins 115 are soldered to printed circuit board 53a.

Printed circuit board 53a has a T-shaped head 131 including radially extending portions 133. T-shaped head 131 provides a larger area for solder pads to be attached to printed circuit board 53a relative to the rectangular-shaped head of printed circuit board 53, which does not include radially extending portions 133. In addition, T-shaped head 131 retains printed circuit board 53a within fitting 27 in case of solder failure such as a failure in the solder connections between pins 115 and printed circuit board 53a. To this end, radially extending portions 133 engage a ledge 135 of fitting 27 to retain printed circuit board 53a within fitting 27. Cover 59a has a shorter length relative to cover 59 so that cover 59a does not cover openings 39 in tube 25.

While various features of the present electronic fluid level indicator have been disclosed, it should be appreciated that other variations may be employed. For example, different slot shapes, circuit trace patterns and additional electronic components may be used. Furthermore, a greater quantity of slots and lands may be provided. It is intended by the following claims to cover these and any other departures from the disclosed embodiments which fall within the true spirit of this invention.

The invention claimed is:

1. An electronic fluid level indicator comprising:
   (a) an electrical connector including a housing and electrical contacts;
   (b) a longitudinally elongated printed circuit board mechanically and electrically connected to the electrical connector, the printed circuit board including substantially flat opposite faces through which are at least two longitudinally elongated and aligned slots separated by a land segment;
   (c) a sensor mechanically and electrically connected to the printed circuit board;
   (d) a longitudinally elongated wire mechanically and electrically connected to the printed circuit board, the wire spanning over the slots; and
   (e) at least a first cover, at least outer sections of the cover being positioned against the printed circuit board, and a clamping rib projecting from an inner section of the first cover clamping the wire against at least one of the faces of the printed circuit board at the land segment.

2. The electronic fluid level indicator of claim 1, further comprising a second cover positioned against one of the faces of the printed circuit board opposite that of the first cover, wherein the wire is folded and returns back over the slots along the opposite face of the printed circuit board, and an inner section of the second cover clamps the folded back portion of the wire against the opposite face of the printed circuit board at the land segment.

3. The electronic fluid level indicator of claim 2, wherein the housing, the first cover, and the second cover are polymeric.

4. The electronic fluid level indicator of claim 2, further comprising a spring coupling a fold of the wire to the printed circuit board adjacent a distal end of the printed circuit board opposite the electrical connector.

5. The electronic fluid level indicator of claim 4, wherein the sensor is a fluid temperature sensor and is located between the spring and the distal end.

6. The electronic fluid level indicator of claim 4, wherein the spring couples the fold of the wire within one of the slots.

7. The electronic fluid level indicator of claim 2, further comprising a hollow rigid tube including a threaded fitting at a proximal end thereof, wherein a portion of the electrical connector is located within the threaded fitting, the tube securing the covers against the printed circuit board free of additional attachment between the covers and the printed circuit board, and a fluid flow gap being located between an outside surface of each of the covers and an inside surface of the tube.

8. The electronic fluid level indicator of claim 2, wherein a peripheral edge of the printed circuit board defines notches that receive fingers projecting from an inside surface of each of the covers.

9. The electronic fluid level indicator of claim 2, wherein each of the covers has an inner surface that defines a longitudinally elongated fluid channel, and each of the covers has multiple apertures that are longitudinally spaced apart from one another and are in fluid communication with the channel.

10. An electronic fluid level indicator comprising:
    (a) an electrical connector including a housing and electrical contacts;
    (b) a longitudinally elongated shaft mechanically and electrically connected to the electrical connector, the shaft including substantially flat opposite faces;
    (c) a longitudinally elongated wire mechanically connected to the shaft;
    (d) a pair of covers disposed on opposite sides of the shaft; and
    (e) a hollow tube including a threaded fitting at a proximal end thereof, wherein a portion of the electrical connector is located within the threaded fitting, the tube encircling and engaging the covers, the tube securing the covers against the shaft free of additional attachment between the covers and the shaft.

11. The electronic fluid level indicator of claim 10, wherein the pair of covers include a first cover and a second cover, the first cover having outer edges positioned against one of the faces of the shaft which is a printed circuit board, the second cover having outer edges positioned against an opposite one of the faces of the printed circuit board.

12. The electronic fluid level indicator of claim 11, wherein the outer edges of the first and second covers are pressed against the opposite faces of the printed circuit board solely due to contact between the covers and an internal diameter surface of the tube.

13. The electronic fluid level indicator of claim 12, wherein each of the first and second covers has a substantially flat outside surface and curved outer surfaces disposed laterally outboard of the flat outside surfaces, the flat outside surfaces being oriented parallel to the opposite faces of the printed circuit board, the curved outside surfaces being shaped to conform to the internal diameter surface of the tube.

14. The electronic fluid level indicator of claim 13, wherein a fluid flow gap is located between the flat outside surfaces of each of the covers and the internal diameter surface of the tube.

15. The electronic fluid level indicator of claim 11, wherein each of the first and second covers has a longitudinally elongated fluid channel disposed between the outer edges thereof to allow fluid to flow between each cover and the printed circuit board.

16. The electronic fluid level indicator of claim 10, wherein at least two longitudinally elongated and aligned slots extend through the opposite faces of the shaft, the slots being separated by a land segment, the wire spanning over the slots.

17. The electronic fluid level indicator of claim 16, wherein each of the covers include a clamping rib projecting from an inside surface thereof, an intermediate segment of the wire being clamped between the land segment and the clamping rib.

18. The electronic fluid level indicator of claim 17, wherein a peripheral edge of the shaft defines notches that receive fingers projecting from the inside surface of each of the covers, the notches and the fingers being longitudinally aligned with the land segment and the clamping rib.

19. An electronic fluid level indicator comprising:
(a) an electrical connector including a housing and electrical contacts;
(b) a longitudinally elongated printed circuit board mechanically and electrically connected to the electrical connector, the printed circuit board having substantially flat opposite faces and at least two longitudinally elongated and aligned slots extending through the faces, the slots being separated by a land segment;
(c) a temperatures sensor mechanically and electrically connected to the printed circuit board;
(d) a longitudinally elongated wire mechanically and electrically connected to the faces of the printed circuit board, the wire including a pair of straight segments and a fold disposed therebetween, each of the straight segments being connected to one of the faces of the printed circuit board and spanning over the slots, the fold extending through one of the slots;
(e) a spring coupling the fold of the wire to the printed circuit board adjacent a distal end of the printed circuit board opposite the electrical connector;
(f) a pair of insulators that each have outer edges, a clamping rib disposed between the outer edges, and at least two longitudinally elongated and aligned fluid channels separated by the clamping rib, the outer edges of the insulators being positioned against the opposite faces of the printed circuit board, the straight segments of the wire being clamped between the land segment of the printed circuit board and the clamping ribs of the insulators; and
(g) a hollow rigid tube including a threaded fitting at a proximal end thereof, wherein a portion of the electrical connector is located within the threaded fitting, the tube surrounding and engaging the insulators to secure the insulators against the printed circuit board, and a fluid flow gap being located between an outside surface of each of the insulators and an inside surface of the tube.

20. The electronic fluid level indicator of claim 19, wherein each of the insulators has multiple apertures that are longitudinally spaced apart from one another, the apertures in the insulators providing fluid communication between the fluid flow gap and the channels.

* * * * *

UNITED STATES PATENT AND TRADEMARK OFFICE
CERTIFICATE OF CORRECTION

PATENT NO. : 10,408,660 B2  
APPLICATION NO. : 15/674037  
DATED : September 10, 2019  
INVENTOR(S) : Wayne Lawrence Soucie et al.

Page 1 of 1

It is certified that error appears in the above-identified patent and that said Letters Patent is hereby corrected as shown below:

On the Title Page

Column 2, Line 1, "fuel" should be --fluid--.

In the Specification

Column 1, Line 32, "6,548,283" should be --6,543,283--.

Column 1, Line 44, "fuel" should be --fluid--.

Column 4, Line 22, "fuel" should be --fluid--.

Column 4, Line 57, "59" should be --69--.

Column 4, Line 57, "59" should be --69--.

Column 4, Line 61, "59" should be --69--.

Column 4, Line 62, "59" should be --69--.

Column 4, Line 67, "59" should be --69--.

Signed and Sealed this  
Twenty-fourth Day of December, 2019

Andrei Iancu  
*Director of the United States Patent and Trademark Office*